US011602904B2

(12) United States Patent
Vilaca

(10) Patent No.: US 11,602,904 B2
(45) Date of Patent: Mar. 14, 2023

(54) METHOD FOR JOINING A METAL COMPONENT AND A POLYMER COMPONENT, AND STRUCTURE COMPRISING SAID COMPONENTS

(71) Applicant: AALTO UNIVERSITY FOUNDATION SR, Aalto Helsinki (FI)

(72) Inventor: Pedro Vilaca, Espoo (FI)

(73) Assignee: AALTO UNIVERSITY FOUNDATION SR, Helsinki (FI)

( * ) Notice: Subject to any disclaimer, the term of this patent is extended or adjusted under 35 U.S.C. 154(b) by 326 days.

(21) Appl. No.: 16/625,996

(22) PCT Filed: Jun. 28, 2018

(86) PCT No.: PCT/FI2018/050516
§ 371 (c)(1),
(2) Date: Dec. 23, 2019

(87) PCT Pub. No.: WO2019/002693
PCT Pub. Date: Jan. 3, 2019

(65) Prior Publication Data
US 2021/0154947 A1      May 27, 2021

(30) Foreign Application Priority Data
Jun. 28, 2017  (FI) ...................................... 20170098

(51) Int. Cl.
*B29C 65/00* (2006.01)
*B32B 7/05* (2019.01)
(Continued)

(52) U.S. Cl.
CPC .......... *B29C 66/304* (2013.01); *B21K 25/005* (2013.01); *B23K 20/1265* (2013.01);
(Continued)

(58) Field of Classification Search
CPC .............. B21K 25/005; B23K 20/1265; B29C 65/0681; B29C 65/44; B29C 65/54;
(Continued)

(56) References Cited

U.S. PATENT DOCUMENTS 7,575,149 B2     8/2009   De Traglia Amancio Filho et al.
8,875,976 B2 *  11/2014   Schultz .............. B23K 20/1275
                                                        228/2.1
(Continued)

FOREIGN PATENT DOCUMENTS

EP          2993029 A1      11/2016

OTHER PUBLICATIONS

J. Altmeyer, et al.; "Effect of the friction riveting process parameters on the joint formation and performance of Ti alloy/short-fibre reinforced polyether ether ketone joints"; Elsevier; Materials and Design 60 (2014) 164-176; 13 pgs.
(Continued)

*Primary Examiner* — James D Sells
(74) *Attorney, Agent, or Firm* — Tarolli, Sundheim, Covell & Tummino LLP

(57) ABSTRACT

The invention concerns a method for joining a metal component and a polymer component, and a structure comprising said components. In the method, an extrusion die plate with a through hole is placed between the metal component and the polymer component. A probe is rotated and plunged across the thickness of the metal component and eventually through said through hole of the extrusion die plate, thereby extruding a part of the metal component through said through hole of the extrusion die plate into the polymer component. The probe has a rotation axis having an offset to the centre of the through hole during the rotating and plunging action.

12 Claims, 4 Drawing Sheets

Figure 1:
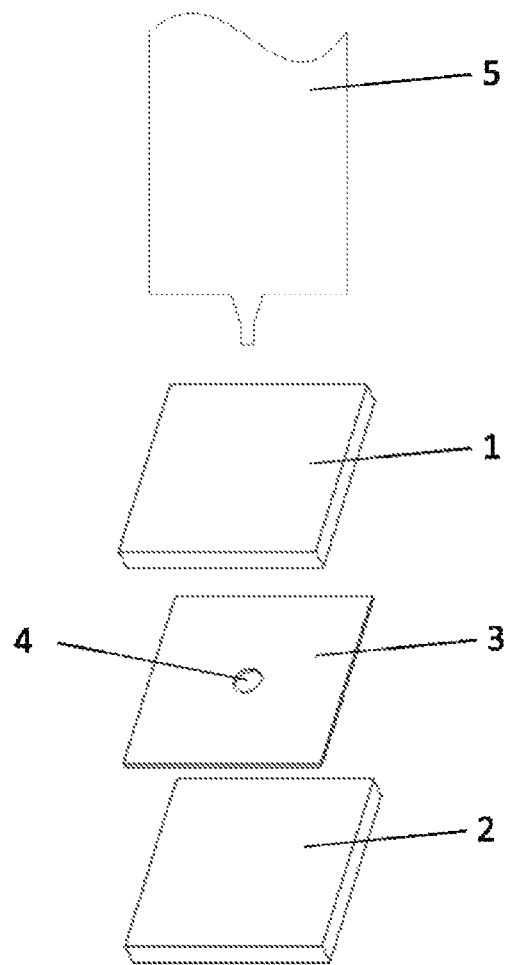

(51) Int. Cl.
| | |
|---|---|
| *B23K 20/12* | (2006.01) |
| *B29C 65/06* | (2006.01) |
| *B29C 65/44* | (2006.01) |
| *B29C 65/54* | (2006.01) |
| *B29C 65/64* | (2006.01) |
| *B32B 3/26* | (2006.01) |
| *B32B 7/08* | (2019.01) |
| *B32B 7/12* | (2006.01) |
| *B32B 15/08* | (2006.01) |
| *B32B 15/20* | (2006.01) |
| *B21K 25/00* | (2006.01) |

(52) U.S. Cl.
CPC .......... *B29C 65/0681* (2013.01); *B29C 65/44* (2013.01); *B29C 65/54* (2013.01); *B29C 65/645* (2013.01); *B29C 66/1122* (2013.01); *B29C 66/21* (2013.01); *B29C 66/41* (2013.01); *B29C 66/7422* (2013.01); *B29C 66/81429* (2013.01); *B29C 66/836* (2013.01); *B29C 66/8322* (2013.01); *B32B 3/266* (2013.01); *B32B 7/05* (2019.01); *B32B 7/08* (2013.01); *B32B 7/12* (2013.01); *B32B 15/08* (2013.01); *B32B 15/20* (2013.01)

(58) Field of Classification Search
CPC . B29C 65/645; B29C 66/304; B29C 66/1122; B29C 66/21; B29C 66/41; B29C 66/7422; B29C 66/81429; B29C 66/8322
USPC ........................................................ 156/73.5
See application file for complete search history.

(56) References Cited

U.S. PATENT DOCUMENTS

2007/0044901 A1    3/2007   Chen et al.
2016/0325488 A1    11/2016  Tanaka et al.

OTHER PUBLICATIONS

S.T. Amancio-Filho, et al.; "Joining of Polymers and Polymer-Metal Hybrid Structures: Recent Developments and Trends"; Wiley Online Library; Published online in Wiley InterScience (www.interscience.wiley.com); 16 pgs.; DOI 10.1002/pen.21424.

Elaheh Ghassemieh; "Materials in Automotive Application, State of the Art and Prospects"; New Trends and Developments in Automotive Industry; www.intechopen.com; 2011; 32 pgs.

S. Das; "Recycling and life cycle issues for lightweight vehicles"; Woodhead Publishing Retrieved from www.knovel.com; 2010; 23 pgs.

* cited by examiner

METHOD FOR JOINING A METAL COMPONENT AND A POLYMER COMPONENT, AND STRUCTURE COMPRISING SAID COMPONENTS

RELATED APPLICATIONS

The present invention is a U.S. National Stage under 35 USC 371 patent application, claiming priority to Serial No. PCT/FI2018/050516, filed on 28 Jun. 2018; which claims priority of FI 20170098, filed on 28 Jun. 2017, the entirety of both of which are incorporated herein by reference.

The invention disclosed in this patent application relates to tools and method for creating joints, preferably spot welding or dissimilar overlap joints between metal and polymer, hereinafter called also THE-FSpW.

FIELD OF INVENTION

The continuously growing need for lightweight design by several industries, mainly in the field of transportation, has led to the usage of alternative lighter materials and new solutions. In search of more lean and efficient designs, new obstacles arise. One of these obstacles is the necessity to join different types of materials together (hybrid joining) with satisfactory connection performance. Hybrid joining techniques are pursued not only due to growing economic and financial motivations but also because of the need to comply with increasingly tighter and more demanding environmental regulations. The use of optimized structural design integrating multi-lightweight materials yields cost savings, reduction on energy consumption that lower levels of carbon emissions. Among the hybrid joints, the joints between aluminium alloys and polymer-based components are the one with better lightweight performance and the most complex to achieve, with the reliability and strength, demanded by high quality industrial fields, such as, aeronautic and automotive industries. The challenge in these hybrid joints, between materials of quite different physical nature, is to activate physically strong and chemically stable joining mechanisms.

THE-FSpW is a new joining process for overlapping joints between a metal component, with focus on aluminium alloys, and a polymer-based component. The joint is obtained in spots where the metal is extruded into the polymer via the through-holes in a thin and highly rigid extrusion die plate, positioned in between the components to join. This new solution has distinct benefits in comparison with the existent alternatives, and arrives in a moment when the perceived need, and market, for these hybrid metal-to-polymer joints is growing.

BACKGROUND

The highly competitive market of construction industries need to comply with increasingly tighter and more demanding environmental regulations. When structures made of aluminium and made of polymer-based materials is a well-consolidated reality, the only feasible way to reach the design requirements of strength and lightweight, with corrosion and temperature resistance is to consider structures made of multi-lightweight materials. A feasible and reliable joining process is the major limitation in the production of these high-performance components, enabling high-energy efficiency operation.

The THE-FSpW is the new joining process and the future solution with improved performance for overlapped joints between a metal component, with focus on aluminium alloys, and a polymer-based component.

PRIOR ART DESCRIPTION

At present day, the two more conventional used techniques to join different types of materials are mechanical fastening and adhesive bonding [1]. When joining thermoplastics, welding can be used to perform the connection, by generating a multi-polymer matrix that results e.g. from the local melting of the polymeric materials with solidification and consolidation of the joint with application of force [2], [3]. However, these processes cannot be applied when the materials to be joined are highly different in physical nature, as the case of hybrid polymer-to-metal joining [1]. The need for the introduction of lighter materials to engineering designs instead of more conventional ones, has led to the development of several alternative joining techniques.

Amongst these techniques are some recently developed processes, such as, Friction Riveting (FricRiveting) [4]. This process is meant to perform hybrid metal-to-polymer/composite joints. The base configuration of this technology consists of a metallic-insert-like cylindrical rivet that by rotating when pressed against a polymeric plate, increases the temperature by friction, which melts or softens the plate and allows its insertion. When the rivet achieves a certain temperature coupled with the axial force being applied to it, plastic deformation takes place, originating a deformed anchor-shaped rivet tip inside the polymeric plate. After the polymer consolidates, the joint is formed. This process has the advantage of not needing pre-joining operations [1], [5]. Another alternative process is Friction Spot Joining (FSpJ) [6]. This technique is used also to join polymer/composite to metal, where frictional heat is generated on one of the metallic sheet surfaces and work is only applied to the metallic component and not to the polymer/composite creating a mechanical interlocked overlapped joint with relatively small degradation on the polymeric material.

SUMMARY OF THE INVENTION

The THE-FSpW uses a thin, non-consumable and rigid extrusion die plate, placed between the overlapping metal and polymer components. The extrusion die plate has one, or more, through-holes, that will serve to extrude the part of the metal component that will be pushed through the hole into the polymer component. The part of the metal component extruded through the hole, is pushed by the probe of a rotating non-consumable tool that plunges across the thickness of the metal component. This portion of processed material from the metal component is forced into the polymer under high pressure and relatively high temperature, due to the local thermomechanical processing action. Adhesive, diffusion and clinging joining mechanisms are thus activated between the metal component and the polymer component. The thin extrusion die plate is applied only locally at the vicinity of the Spot welds and remains in the sandwich structure, promoting the geometric stability of the joints, and thus protecting the joint and its life under fatigue loading.

The THE-FSpW process produces a non-axis-symmetrical high volume hook of metal extruded into the polymer based component, that non-of the existent techniques have capacity to generate. Additionally, THE-FSpW process provides the activation of multi joining mechanisms, encompassing the chemical bonding of the adhesive technology, and the mechanical tensile shear capacity of mechanical fastening, FSpJ and FricRiveting. The THE-FSpW process provides a high resistance to peeling and a new paradigm in supporting torsion mechanical loading. In contrast, the FSpJ and FricRiveting are based on the friction processing induced by a rotative symmetrical tool, in the case of FSpJ, or the symmetrical rivet, in the case of FricRiveting, and thus the joints are essentially symmetrical with low resistance to torsion, as in the case of mechanical fastening.

The THE-FSpW process produces a non-axis-symmetrical high volume hook of metal extruded into the polymer based component, that non-of the existent techniques have capacity to generate. The concept of THE-FSpW process also enables the production of multiple spot welds in one tool processing action.

The THE-FSpW process is a disruptive invention, not only complementing, but also replacing some of the actual state of the art in manufacturing technology. Because THE-FSpW process operates in solid state with high energy efficiency it can be considered an environmental friendly process, providing solution for a new step forwards in the structural optimization with even more environmental friendly structural components.

The THE-FSpW process enables producing joints with better overall performance. The unique enhanced properties enable to reduce significantly the number of spot welds required in one component and thus higher productivity with reduction of the overlap extension, thus saving material and structural weight.

LIST OF FIGURES

FIG. 1 presents the components of THE-FSpW process to join the metal component 1 to the polymer component 2, using as non-consumable tools the extrusion die plate 3, with the through hole 4, and the rotating and plungeable tool 5.

Figure 2:
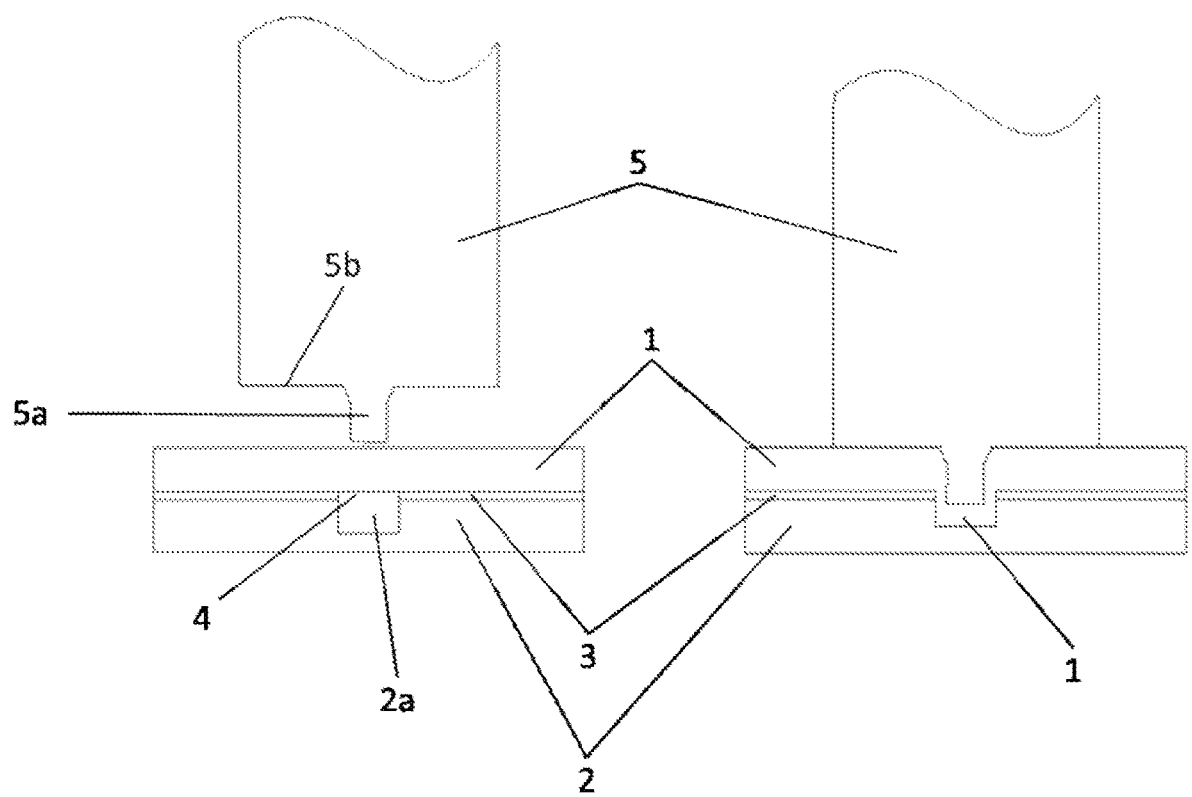

FIG. 2 presents the sequence of THE-FSpW process: left) Start position; right) Extrusion period with the probe in its deepest plunged position forcing the metal component 1 into the polymer component 2.

Figure 3:
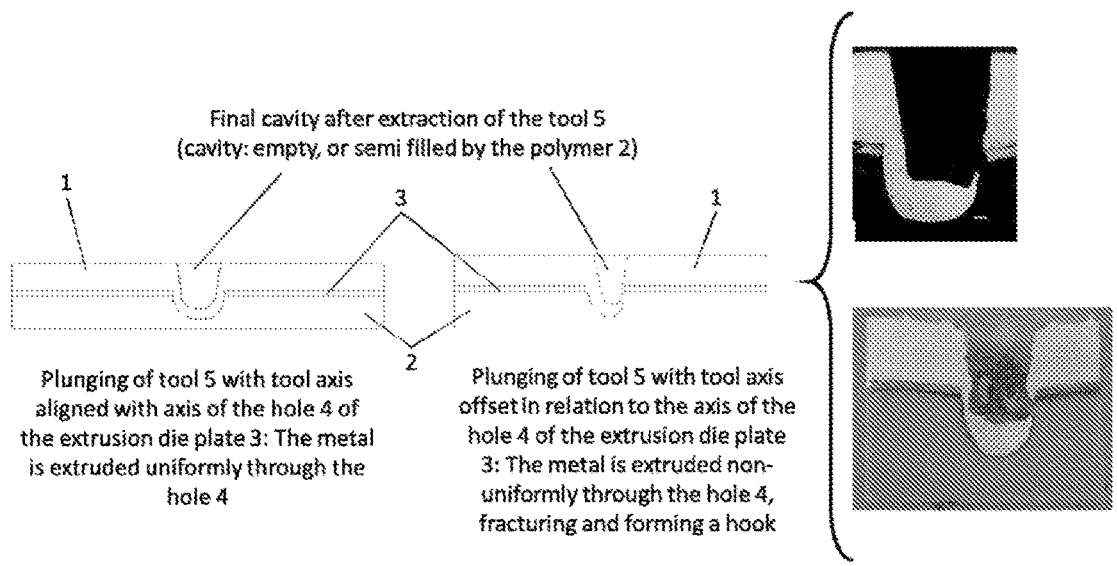

FIG. 3 presents the application of THE-FSpW process with local plunge: left) no offset between the axis of the tool 5 and the hole 4; right) small offset between the axis of the tool 5 and the hole 4.

Figure 4:
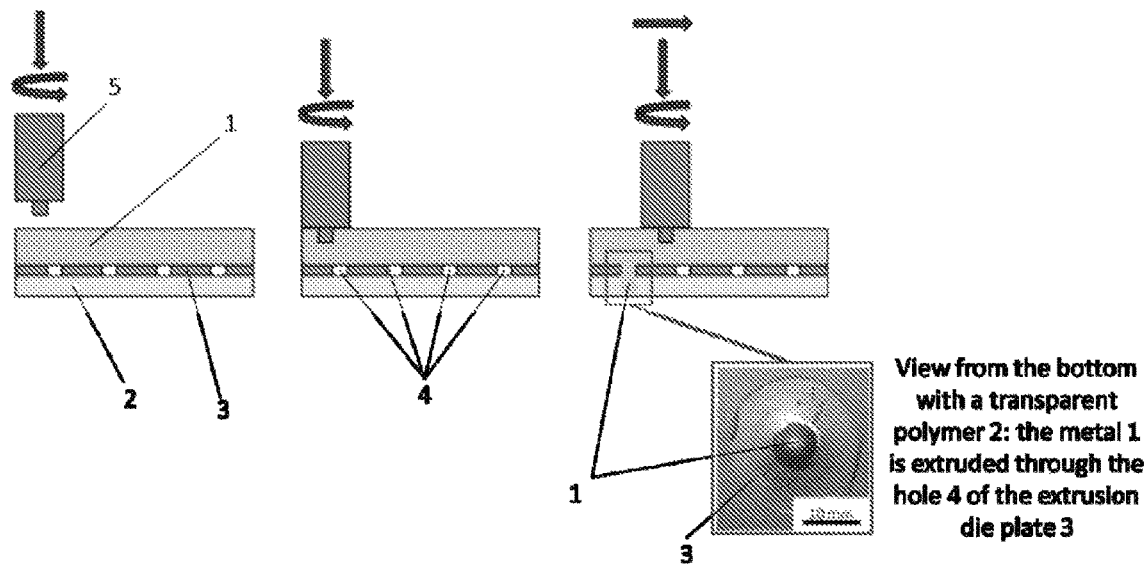

FIG. 4 presents the application of THE-FSpW process with continuous plunged tool 5, travelling along the path defined by the sequence of holes 4 in the extrusion die plate 3.

Figure 5:
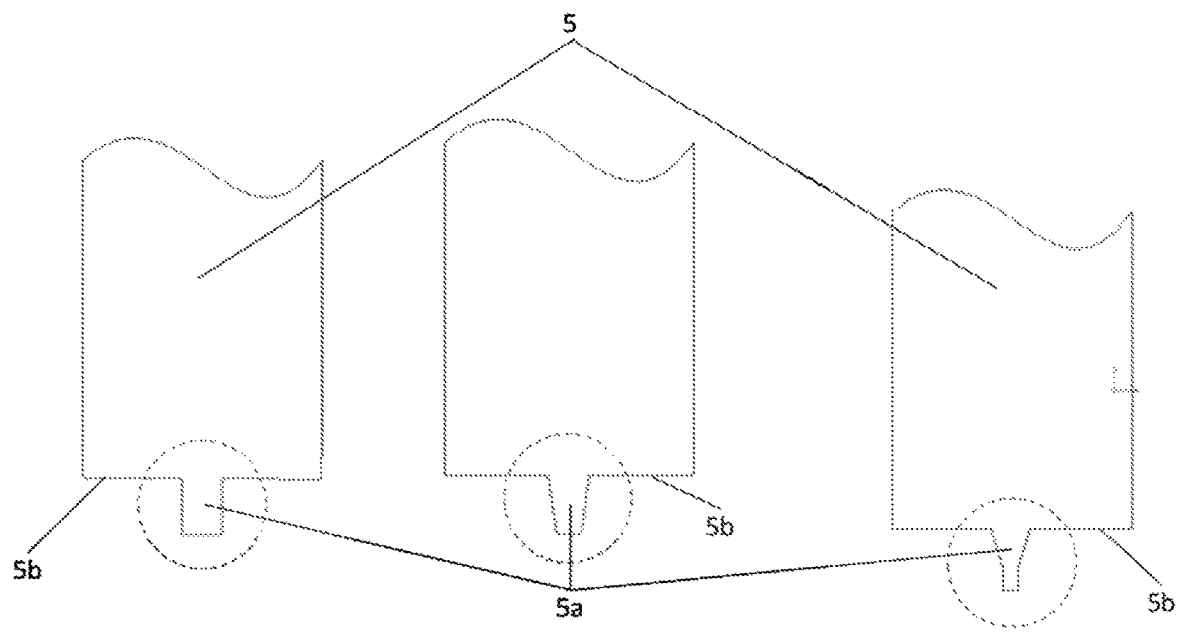

FIG. 5 presents alternative shapes for the probe 5a, of the non-consumable tool 5.

Figure 6:
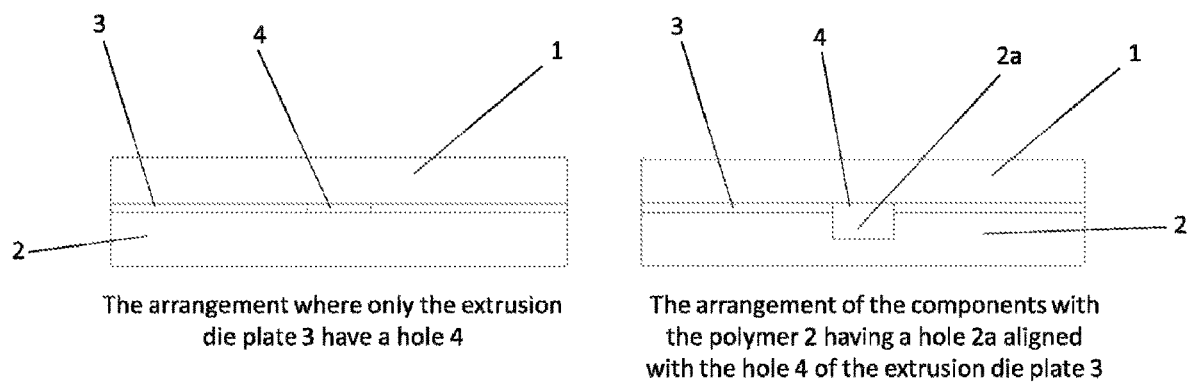

FIG. 6 presents the surface of the polymer component 2, contacting the extrusion die plate 3, which can be flat (left), or have a shallow hole 2a, aligned with the hole 4, of the extrusion die plate 3.

DETAILED DESCRIPTION

THE-FSpW is a process to produce spot welds between metal and polymer in an overlap joint. The method uses a thin, non-consumable and rigid extrusion die plate 3, located between the overlapping metal component 1 and polymer component 2 (see FIG. 1), and a non-consumable, rigid plungeable and rotatable tool 5 with a probe 5a and a shoulder 5b. The tools in this process are the extrusion die plate 3 and the tool 5.

The extrusion die plate 3 has one, or more, through-holes 4, that will serve to extrude the part of the metal component 1, that will be pushed through the hole into the polymer component 2 (FIG. 2). The part of the metal component 1 extruded through the hole 4, is pushed through the hole 4, by the probe 5a of the rotating tool 5, that plunges across the thickness of the metal component 1, and eventually continues through the extrusion hole 4 (FIG. 2). The shoulder 5b of the tool 5 can be rotating, or be static, in permanent contact with the free surface of metal component 1, or following the movement of the probe, and thus just contacting the free surface of metal component 1, when the probe is near its most deep plunged position within the metal component 1. The action of the shoulder is to close the deformation zone of the metallic component 1, avoiding losing material into flash. With this action, if the metal component 1 is locally less resistant than the extrusion die plate, the material from the metal component 1 in the vicinity of the extrusion hole 4, is forced/extruded into the polymer. This portion of processed material from the metal component 1, is forced into the polymer under high pressure and relatively hot, due to the thermomechanical processing action. Adhesive, diffusion and clinging joining mechanisms are thus activated between the metal component 1 and the polymer component 2.

A particular high level of clinging joining effect is obtained, corresponding to the strongest joint, when the axis of the tool 5 has a small offset in relation to the axis of the extrusion through-hole 4 (FIG. 3). In these conditions, the extruded material has asymmetrical wall thickness and fracture in the lower thickness zone happens during the extrusion process, forming a hook and allowing the material from the polymer component 2, to flow back into the volume of the cavity left free by the tool 5, when this tool 5 retracts at the end of the weld cycle (FIG. 3).

An alternative approach for the same joining method, is to travel the non-consumable tool continuously plunged, along the path defined by the sequence of holes 4 in the extrusion die plate 3 (FIG. 4). In this approach, the shoulder is always in contact with the free surface of the metal component 1, and the tip of the probe 5a, will travel over the extrusion die plate 3, just plunging deeper locally, within the vicinity of each one of the holes 4 of the extrusion die plate 3.

The extrusion die plate 3 can be located only at each spot position, with only 1 hole 4. In alternative one extrusion die plate 3, can have 2 or mode holes 4 and serve as extrusion die in multiple locations, with the tool 5 applied via local plunging (FIG. 2 and FIG. 3), or being applied continuously (FIG. 4).

The probe 5a and the shoulder 5b of the tool 5 can be made in one single component, or made of multicomponent assembled together. The shoulder 5b of the tool 5 can be flat, concave or convex. If the shoulder 5b and probe 5a are made of multicomponent, then the shoulder can be rotating or can be static. If the shoulder 5b and probe 5a are made of multicomponent, then the shoulder can be static in permanent contact with the free surface of the metal component 1, during the plunging and extraction movements of the probe 5a. The probe 5a of the tool 5, can be cylindrical, or conical or combination of conical with cylindrical. Namely, the probe 5a of the tool 5, can be conical at the top, and cylindrical at the tip (FIG. 5), to enable a penetration within the through hole 4, of the extrusion die plate 3. This last solution is the most efficient in extruding the metal component 1, into the polymer component 2.

The surface of the polymer component 2, contacting the extrusion die plate 3, can be flat, or have a shallow hole 2a, aligned with the hole 4, of the extrusion die plate 3. This shallow blind hole 2a, enables to receive the extruded metal component 1, with controlled forging pressure (FIG. 6).

The parameters controlling the process THE-FSpW are the following:
1. Geometry of the probe 5a
2. Geometry of the shoulder 5b
3. Rotation speed of the tool 5, or of the probe 5a, if the shoulder 5b is static
4. Plunging speed or plunging force of the tool 5
5. Dwell time at the maximum plunge depth, in plunging force or vertical position control
6. Extraction speed of the tool 5
7. Travel speed of the tool 5, if the probe 5a is continuous plunged in the metal component 1, traversing along the path of holes 4 in the extrusion die plate 1
8. Offset distance between the axis of the tool and the axis of the hole 4
9. Material and thickness of the extrusion die plate 1
10. Dimension (including thickness) of the extrusion die plate 1
11. Diameter of the hole 4 of the extrusion die plate 1
12. Number of hole 4 of the extrusion die plate 1
13. Distance between the holes 4, if there are 2 or more holes 4
14. Material and thickness of the metal component 1
15. Material and thickness of the polymer component 1

NOMENCLATURE

1—Metal component;
2—Polymer component;
2a—shallow blind hole (optional) in polymer component 2, aligned with the hole-through 4 of the extrusion die plate 3;
3—Extrusion die plate (thin and rigid plate compared with the metal 1 and the polymer 2, at processing conditions);
4—Hole through the extrusion die plate;
5—Non-consumable and rigid welding tool;
5a—Probe of the non-consumable and rigid welding tool 5;
5b—Shoulder of the non-consumable and rigid welding tool 5.

CITATIONS

[1] S. T. Amancio-Filho, J. F. Dos Santos, Joining of polymers and polymer-metal hybrid structures: Recent developments and trends, Polym. Eng. Sci. 49 (2009) 1461-1476. doi:10.1002/pen.21424.
[2] P Mallick, Materials, Design and Manufacturing for Lightweight Vehicles, 2010. doi:10.1533/9781845697822.2.309.
[3] E. Ghassemieh, Materials in Automotive Application, State of the Art and Prospects, New Trends Dev. Automot. Ind. (2011) 365-394. doi:10.5772/1821.
[4] S. T. Amancio-Filho, M. Beyer, J. F. dos Santos, Method of connecting a metallic bolt to a plastic workpiece, 2009. internal-pdf://3352337294/US7575149132_fricriveting.pdf.
[5] J. Altmeyer, J. F. F. dos Santos, S. T. T. Amancio-Filho, Effect of the friction riveting process parameters on the joint formation and performance of Ti alloy/short-fibre reinforced polyether ether ketone joints, Mater. Des. 60 (2014) 164-176.
[6] E.P. Specification, Ep 2 343 975 b1 (12), 1 (2012) 1-12.

The invention claimed is:

1. A method for joining a metal component and a polymer component, the method comprising:
obtaining a metal component and a polymer component;
obtaining an extrusion die plate having one through hole;
placing the extrusion die plate between said metal component and said polymer component;
rotating and plunging a probe of a non-consumable and rigid tool across the thickness of the metal component and eventually through said through hole of the extrusion die plate, thereby extruding a part of the metal component through said through hole of the extrusion die plate into the polymer component,
wherein the probe has a rotation axis having an offset to the centre of said through hole of the extrusion die plate during the rotating and plunging action.

2. A method according to claim 1, wherein the method further comprises
retracting the probe of the tool, and
allowing the polymer component to flow back to a cavity in the metal component created by the rotation and plunging of the probe.

3. A method according to claim 1, wherein the tool comprises a shoulder, and the method further comprises
moving the shoulder of the tool in contact with a free surface of the metal component.

4. A method according to claim 1, wherein the rotating and plunging action produces a hook of extruded metal of the metal component into the polymer component.

5. A method according to claim 1, wherein the metal component comprises aluminium.

6. A method according to claim 1, wherein the metal component and the polymer component are joined by adhesive, diffusion and clinging joining mechanisms.

7. A method according to claim 1, wherein the method further comprises:
travelling the probe of the tool while rotating and plunging the probe of the tool.

8. A method according to claim 2, wherein the tool comprises a shoulder, and the method further comprises
moving the shoulder of the tool in contact with a free surface of the metal component.

9. A method according to claim 8, wherein the rotating and plunging action produces a hook of extruded metal of the metal component into the polymer component.

10. A method according to claim 9, wherein the metal component comprises aluminium.

11. A method according to claim 10, wherein the metal component and the polymer component are joined by adhesive, diffusion and clinging joining mechanisms.

12. A method according to claim 11, wherein the method further comprises:
travelling the probe of the tool while rotating and plunging the probe of the tool.

* * * * *